United States Patent [19]

Draxler

[11] 4,093,906
[45] June 6, 1978

[54] PERMANENT MAGNET PULSE GENERATOR AND METHOD OF FORMING AND ASSEMBLY

[75] Inventor: James Richard Draxler, Fond Du Lac, Wis.

[73] Assignee: Brunswick Corporation, Skokie, Ill.

[21] Appl. No.: 636,105

[22] Filed: Nov. 28, 1975

[51] Int. Cl.² ...................... H02K 15/02; H02K 21/22
[52] U.S. Cl. ........................................ 322/51; 29/598; 29/608; 310/43; 310/153; 310/156
[58] Field of Search ................. 29/598, 602, 607, 608, 29/609; 322/47, 46, 51; 310/152, 153, 156, 70 A, 70 R

[56] References Cited

U.S. PATENT DOCUMENTS

| | | | |
|---|---|---|---|
| 1,484,619 | 2/1924 | Blake | 310/152 X |
| 3,521,149 | 7/1970 | Roesel, Jr. | 322/47 |
| 3,715,650 | 2/1973 | Draxler | 310/70 A X |
| 3,728,786 | 4/1973 | Lucas et al. | 310/156 X |
| 3,851,198 | 11/1974 | Minks et al. | 310/70 A X |
| 3,861,028 | 1/1975 | Mittag | 29/598 |
| 3,872,334 | 3/1975 | Loubier | 310/156 X |

*Primary Examiner*—Robert J. Hickey

*Attorney, Agent, or Firm*—Andrus, Sceales, Starke & Sawall

[57] ABSTRACT

A two-cycle engine in such as an outboard motor includes an engine shaft and a flywheel mounted on the shaft and having an inner cylindrical hub portion. A rubber-like magnet strip is adhesively attached about the hub portion with an outer protective shield adhesively bonded to the strip. The strip includes upper and lower magnetic areas which are oppositely and radially magnetized to establish an axially directed field adjacent the outer periphery of the strip. A triggering coil unit includes a C-shaped core with the poles of the core radially aligned with the upper and lower areas of the magnet strip such that the field passes therethrough. The strip is magnetized after assembly by an electromagnetic unit having a semi-circular core with a U-shape cross-section aligned with the strip. A coil of a single turn or a plurality of turns are wound circumferentially in the semi-circular core to establish a magnetizing field directed from the semi-circular core radially into and through the one area of the strip to the hub, axially through the hub to the opposite area of the strip and returning to the core radially outwardly through the other area of the strip. The magnetizing field saturates the upper and lower areas of the strip to form oppositely polarized permanent magnets.

15 Claims, 6 Drawing Figures

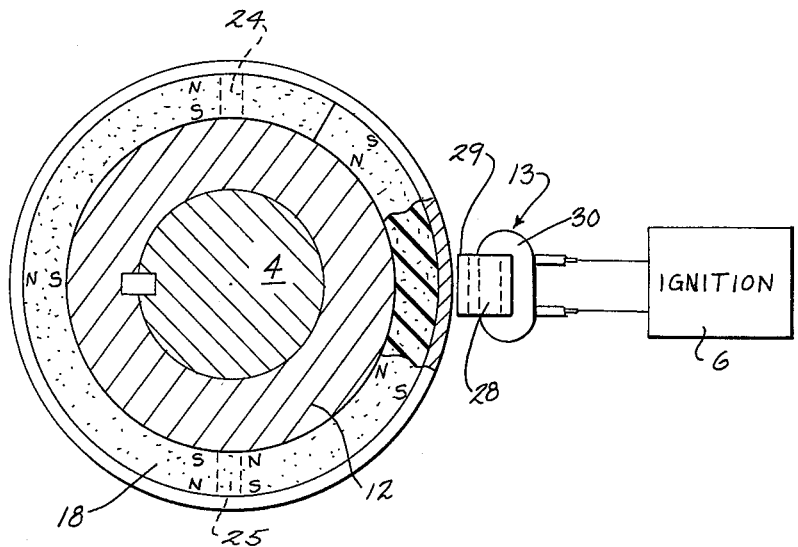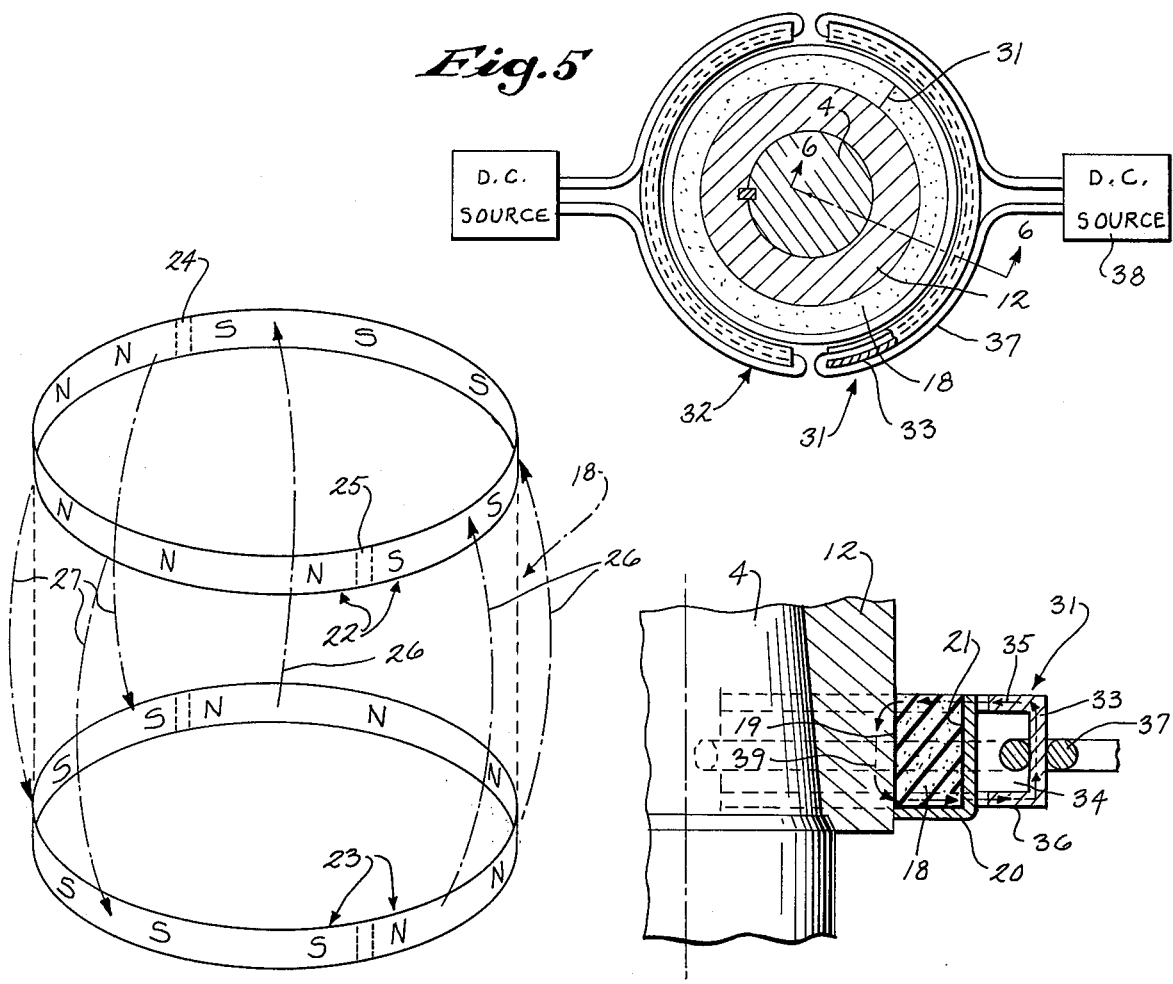

PERMANENT MAGNET PULSE GENERATOR AND METHOD OF FORMING AND ASSEMBLY

BACKGROUND OF THE INVENTION

This invention relates to a permanent magnet pulse generator and particularly to a permanent magnet rotor coupled to the drive shaft of a two stroke engine for generating ignition control pulse signals, and to a simplified method of manufacturing the same.

Various control and operating systems require time spaced pulse signals with respect to the predetermined operational sequence. Ignition systems for internal combustion engines, for example, require energy pulses fed in proper sequence and in time spacing to the spark plugs of the several cylinders in synchronism with the speed of the engine. Recently developed capacitor discharge ignition systems have a capacitor charged from a suitable source and then discharged through a triggered switch such as a silicon controlled rectifier and a pulse transformer to the spark plug. The capacitor may be charged to the desired level through a battery-converter or through an engine driven alternator, the latter being particularly adapted to use in internal combustion engines such as outboard motors, snowmobiles and the like. In either system, a trigger pulse source must be provided for activating of the triggered switch means in appropriate time spaced sequence. Various pulse signal generators which are designed to be driven directly from the engine have been suggested to produce the necessary time spaced trigger signals. An unusually satisfactory functional trigger generator assembly is disclosed in U.S. Pat. No. 3,715,650 which issued on Feb. 6, 1973 to the present inventor. Generally, the generator disclosed therein is applied to a two-cylinder engine and includes an annular permanent magnet rotor unit having diametrically opposite halves of the unit oppositely polarized in a generally axial direction. A pick-up coil is mounted immediately adjacent to the periphery of the magnet unit and in each polarization changeover position a short pulse signal is generated in the pick-up coil unit. In actual practice, as applied to an outboard motor, the rotor unit includes an axially premagnetized ceramic magnet secured to the flywheel hub by a pair of machined clamping members. One clamping member is bonded to and extends from the hub. The annular magnet, with pole shoes secured to the opposite end faces thereof, is assembled on a second machined clamping member which is then threaded into the first clamping member to securely clamp the magnet in position. The clamping members thus project from the lower end of the hub to locate the annular magnet aligned with a pick-up coil unit. This trigger generator provides a very satisfactory pulse source from a functional standpoint and particularly has been found to produce reliable triggering of the ignition system. The various components must be formed with proper machined surfaces and tolerances to provide the desired quality in the assembly commanded by high quality ignition production. This construction is, therefore, somewhat costly.

Further, although the axial polarization of the magnet as disclosed with the flux reversal at appropriate positions on the periphery of the magnet member produces significant pulse signals, the magnets are necessarily preformed and then assembled with the pole shoes to effect the desired axially directed peripheral field. Although a highly functional construction is obtained, the multiple component construction, particularly with requirements of reasonable tolerances, further increase the cost of the rotor unit. The manufacture of the several components, with the required machining to ensure properly abutting faces, as well as the required labor to assemble the several components, thus results in a relatively expensive trigger generator unit. Additionally, the interconnection of the assembly to the lower end of the hub increases the required shaft extension of the engine. Although this does not affect the functioning of the assembly, it does require increasing the profile of the engine power engine unit.

In outboard motors and the like, efforts are generally made to minimize size and, in particular, to lower the profile. The required extension of the rotor unit requires an appropriate increased profile for use of the systems.

On the whole, the trigger generator assembly such as described above is a highly functional assembly or unit which provides a very practical implementation of an alternator-driven, breakerless ignition system. The cost and aesthetic construction, however, have certain adverse characteristics such that it does not provide a truly optimum construction from all practical considerations.

SUMMARY OF THE PRESENT INVENTION

The present invention is particularly directed to a significant simplification in the magnetic polarization and structural arrangement of a permanent magnet rotor to significantly minimize the number of components and thereby significantly reduce the manufacturing and assembly cost while further permitting a pulse signal at least equal to that obtained by prior art structures.

Generally, in accordance with a most significant teaching of the present invention, an annular permanent magnet member is provided with axially and circumferentially spaced areas of opposite polarity radially magnetized. The opposite radial magnetization of the permanent magnet areas define opposite polarity magnet poles at a radial edge of the member such that the magnetic field extends axially of the annular permanent magnet at said radial edge. The magnetized portions are each reversely magnetized along adjacent circumferential portions to define areas of flux reversal in the field. A pick-up coil unit is mounted within said field and may advantageously include a generally C-shaped core of the prior art with the core ends aligned with the axially spaced radially magnetized poles. Relative rotation between the rotor and coil unit affect a generation of a pulse signal in the coil at the positions of flux reversal.

The axial spacing and radial polarization of the magnetized portions of the permanent magnet strip permit convenient and simplified magnetization of the magnet after its mounting and assembly with its rotating support. In accordance with this feature, another aspect of the invention is an encircling electromagnetic unit aligned with the magnet member for magnetizing the strip. The unit includes a core with spaced poles aligned with the axially spaced portions of the magnet member. The electromagnetic unit establishes an appropriate radially directed field as hereinafter described to directly affect the desired magnetization of the permanent magnet member.

In a practical implementation of the present invention, a flywheel hub is formed of a material such as steel having a high magnetic permeability with an annular magnet strip bonded by a suitable adhesive or otherwise affixed to the hub, in an unmagnetized state. After the assembly, the magnet member is polarized. In this configuration the permanent magnet member is formed from a strip of rubber based material having powered magnetic material suspended therein, such as Plastiform ® manufactured by the 3M Company, which can be preformed with the proper cross-sectional dimensions, wrapped about the hub member and bonded thereto by a suitable adhesive with a single abutting joint. A protective cup is preferably secured, as by an adhesive, to the exterior surface of the rubber magnet strip before polarization to provide physical protection of the rubber member. Thus the cup may be formed of a suitable non-magnetic stainless steel or the like which can be readily formed by stamping or the like.

After the assembly of the magnet member, the magnet strip is polarized in a unique method. For generating two pulses per rotor revolution, a pair of semi-circular or horseshoe shaped cores having a generally U-shape cross-section are assembled about the permanent magnet with the adjacent cores spaced slightly at their abutting ends. The cores are placed with the U-shaped configuration opening toward the magnet strip with the ends of the "U" defining inwardly projecting axially spaced poles in alignment with the axially spaced magnetized areas of the strip. Between the poles the core defines an inner recess within which a single or multiple turn coil is located. The two electromagnetic coil units are oppositely energized to establish oppositely directed magnetic fields through the aligned permanent magnet member and thereby directly creating the desired opposite polarization.

In instances where additional pole reversals are required, appropriately shaped circumferentially extended electromagnets may, of course, be employed to increase the number of circumferentially extending pole elements within the permanent magnet element.

The present invention provides a simplified trigger pulse generator assembly which can be readily adapted to mass production processes. Further, the permanent magnet structure can be readily and directly applied to existing permanent magnet ignition trigger generators for outboard motors and the like with lower profile construction of the motor.

BRIEF DESCRIPTION OF THE DRAWINGS

The drawings furnished herewith illustrate the preferred construction of the present invention in which the above advantages and features are clearly disclosed as well as others which will be readily understood from the following description of the illustrated embodiments of the invention.

In the drawings:

FIG. 3 is a fragmentary end view further illustrating the rotor assembly of the trigger generator;

FIG. 4 is a pictorial, diagrammatic view illustrating the polarity and flux field appearing on the periphery of the common magnet member of the trigger generator;

FIG. 5 is a plane view of the permanent magnet rotor assembly and a magnetizing assembly for magnetizing of the magnet; and FIG. 6 is a vertical section taken generally on line 6—6 of FIG. 5.

DESCRIPTION OF THE ILLUSTRATED EMBODIMENT

Figure 1:
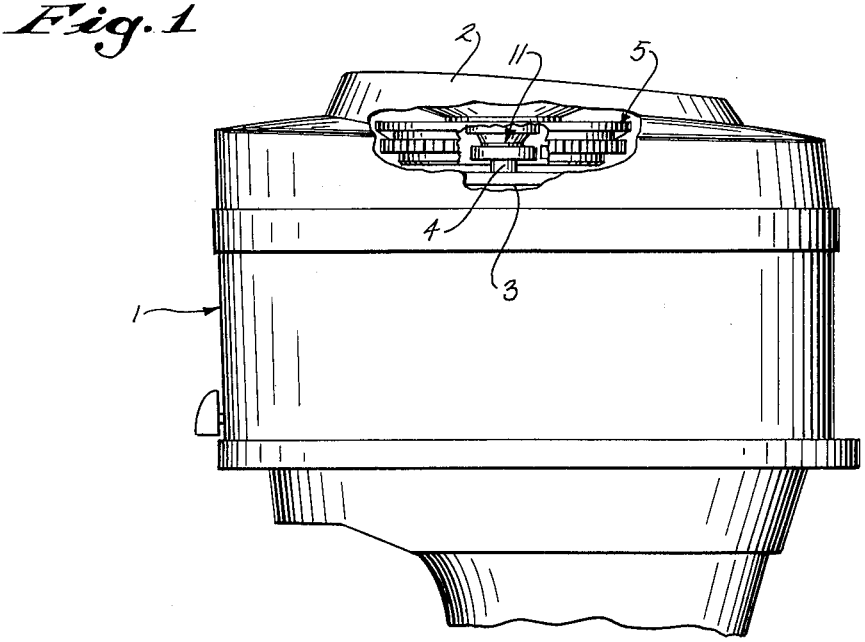
FIG. 1 is a side elevational view of the powerhead for a two-cylinder outboard motor unit with parts broken away to show inner details of construction.

Referring to the drawing and particularly to FIG. 1, the upper powerhead 1 of an outboard motor unit is illustrated with portions of the outer protective shell or cowl 2 broken away to illustrate to show the internal powerhead unit. Generally, the powerhead unit includes an internal combustion engine 3 which is shown as a two-cylinder construction having an engine shaft 4 projecting upwardly within the cowl 2. A generally inverted cup-shaped flywheel 5 is secured to the upper end of the engine shaft 4 and rotates therewith. For purposes of disclosure and description, the engine is assumed to be provided with an alternator-driven capacitor discharge ignition unit 6 which may be of any suitable construction, for example, such as that shown in U.S. Pat. No. 3,715,650. Generally, a system or unit is diagrammatically shown with a capacitor 7 of the ignition system charged from a suitable alternator unit 8 having a rotor 9 secured within the depending skirt portion of the flywheel 5 with a stator 9a secured to the upper end of the engine 2, within the flywheel 5. A trigger generator 10, illustrating an embodiment of the invention, is located immediately adjacent the alternator unit 8. The generator 10 includes a permanent magnet rotor unit 11, which particularly illustrates the present invention and which is secured to the mounting hub 12 of the flywheel 5. A trigger coil unit 13 is secured to the upper end of the engine in radial alignment with the outer periphery of the permanent magnet rotor unit 11. Coil unit 13 generates pulses as a result of the rotation of rotor unit 11 and is connected to a gated or triggered switch 14 such as a controlled rectifier. Coil unit 13 is angularly oriented and positioned with respect to the flywheel 5 and particularly shaft 4 to effect pulse generation in timed relationship with the position of the engine shaft and interconnecting the piston for proper firing of the engine.

More particularly, in the illustrated embodiment of the invention, the flywheel hub 12 is generally a tubular member having an internal, cone-shaped opening adapted to telescope downwardly over the correspondingly shaped shaft 4 and interconnected thereto by a suitable key or the like. The hub 12 includes an upper flange mounting portion 15 to which the flywheel 5 is secured as by suitable bolts 16. The hub 12 includes a lower cylindrical portion 17 to which the permanent magnet rotor unit 11 of the generator 10 is secured. The hub is formed of a suitable steel which has a high magnetic permeability and forms a return path for the field of the permanent magnet rotor 11 as presently described.

Generally, the illustrated embodiment of the permanent rotor unit 11 includes an annular permanent magnet member 18 which is secured directly to the circular, cylindrical portion 17 by a suitable adhesive 19. A non-magnetic cup element 20 encloses the outer side and bottom of the permanent magnet member 16 and is secured thereto by a suitable adhesive 21. The cup element 20 is formed of a very thin metal such as stainless steel to provide good physical protection without interferring with the coupling of a magnetic field of the magnet member 18 to the stator or coil unit 13.

Adhesives 19 and 21 may be of any suitable known or desired bonding material and is preferably a two-part epoxy resin which will provide a very strong and long life bond.

Figure 2:
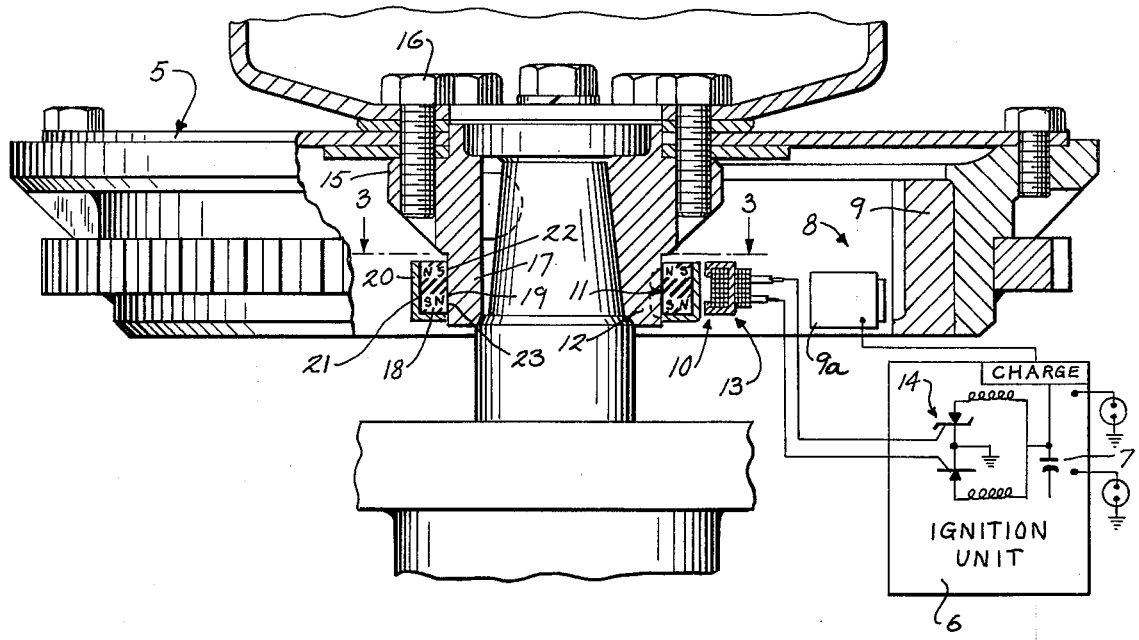
FIG. 2 is an enlarged fragmentary view of the flywheel assembly illustrating the mounting of the trigger generator with parts broken away and sectioned to show details of the construction.

In accordance with the embodiment shown in FIGS. 1 - 3, the permanent magnet member 18 is magnetized so as to define a pair of axially spaced permanent magnets. In the illustrated embodiment of the invention a top magnet 22 and a lower magnet 23 are formed within the permanent magnet strip 18, as shown by the schematic illustration of FIG. 4. The permanent magnet member 18 is a continuous, magnetizable, rubberlike member with the magnets 22 and 23 formed therein by appropriate polarization.

The magnets 22 and 23 are polarized radially on the annular permanent magnet member 18 and are oppositely polarized as shown by the North and South identifying symbols (N) and (S). In addition, the magnets 22 and 23 are formed within the strip 18 with oppositely polarized circumferential magnetic portions, with the polarization of the magnets 22 and 23 reversed with respect to each other such that the adjacent, circumferential ends of these magnetic portions define flux reversal zones schematically identified as 24 and 25. The illustration is of a two-cylinder engine, so the flux reversal zones appear on diametrically opposite points of the member 18.

The permanent magnet 18, thus polarized, defines a plurality of peripheral magnetic poles, as diagrammatically illustrated in FIG. 4, and generates a pair of oppositely directed peripheral magnetic fields 26 and 27 which reverse at zones 24 and 25.

The stator or pick-up coil unit 13 is mounted to the engine 3 in alignment with the periphery of the permanent magnet member 18. The pick-up coil unit 13 includes a suitable magnetic core 28 of a generally rectangular C-shaped configuration (See FIGS. 2 and 3) defining a pair of inwardly projecting poles 29 in close spaced relation to the periphery of the cup element 20. The poles 29 are also spaced to align with the magnets 22 and 23 such that the magnetic field 26 or 27 established at the periphery, in taking the lowest reluctance path, passes through the core 28 and the small air gaps between the core 28 and permanent magnet member 18. A coil 30 is wound on the core 28 and connected through a suitable connecting circuit to fire the controlled rectifier 14.

As the engine operates, the engine shaft and interconnected flywheel 5 rotate with corresponding rotation of the interconnected permanent rotor unit 11. As a field or flux reversal zone 24 or 25 moves past the core 28 the flux through the core 28 rapidly reverses resulting in generation of a trigger pulse signal within the coil 30 in accordance with the well-known electromagnetic phenomena and functional operation similar to the trigger generator shown in the U.S. Pat. No. 3,715,650.

The trigger generator and particularly the rotor unit 10 of the present invention provides a simple, structural apparatus and one which can be manufactured and assembled in a mass production process at an extremely low cost. Generally the member 18 as illustrated is practically formed of a flat rubber-like strip of a length which just encircles the circular portion with a single abutting joint 31. The strip is formed of rubber material with magnetic particles embedded therein. The strip can be readily obtained in suitable, preformed sizes, does not require any machining or any other expensive processing and may be reliably, adhesively bonded to the hub 12 and to the cup element 20. Element 20 may be accurately formed by inexpensive manufacturing processes, also without the necessity of any machining. The total assembly thus provides a rotor unit which does not require any machine parts and a minimum number of elements which can be quickly and reliably assembled. The radial polarization of the magnet member 18 to develop the axially directed magnetic fields 26 and 27 has also been found to permit a unique method of polarizing the unit 10 after assembly to the hub. The total rotor unit 10 can be assembled and then polarized to define the magnets 22 and 23. The magnet member 18 can, of course, be magnetized before assembly but is preferably magnetized after assembly, for example, as shown in FIGS. 5 and 6.

Referring particularly to FIGS. 5 and 6, the assembled rotor unit 11 and hub 12 is illustrated assembled with the engine shaft 4. A pair of generally semicircular electromagnetic units 31 and 32 are mounted in circumferential spacing and alignment with the outer periphery of the rotor unit 11 and magnetic strip 18. The electromagnetic units 31 and 32 have a corresponding construction and unit 31 is described with the corresponding elements of the unit of 32 identified by corresponding primed numbers.

Referring particularly to FIG. 6, the unit 31 includes a core 33 of a generally semicircular extent. The core 33 is a C-shaped channel opening toward the member 18 to define an inner recess or slot 34 with an upper leg or pole 35 and a lower leg or pole 36. The axial dimension of the channel core 33 is essentially that of the permanent magnet member 18 and the upper and lower poles 35 and 36 are aligned with the portion for the upper and lower magnets 22 and 23. A coil 37 is wound on the core 33, and in the illustrated embodiment of the invention is shown as a single turn coil, including an inner run located within the core recess and with the opposite ends extended outwardly and backwardly along the outer periphery of the core 33. The coil terminals are connected to a single direct current source 38 for energization of the coil 37. The source 38 establishes a magnetizing field which passes from the core 33 through the portion of member 18 defining magnets 22 and 23, with the return through the hub 12 of the flywheel 5, as clearly illustrated in FIG. 6 by the flux lines 39. The field is selected to fully saturate the corresponding aligned portion of the permanent magnet member 18 and thereby develop saturated magnetic pole portions which form the top and bottom radial magnets 22 and 23, with the magnets directly, oppositely polarized as desired to define the opposite polarity peripheral poles at the top and bottom of the periphery of the member 18.

The opposite electromagnetic unit 32 is similarly constructed but is energized to develop an oppositely directed magnetic field through the corresponding aligned portion of the magnet member 18. It thus similarly defines top and bottom magnets 22 and 23 which are oppositely polarized with respect to each other and which, as a unit, are also oppositely polarized with respect to the diametrically opposite half of the member 18.

The polarization fixtures can, of course, be readily applied to the flywheel subassembly to provide the peripheral polarization completely after the assembly of the components.

The illustrated embodiment shows a preferred construction of the invention. The various components can, of course, be otherwise assembled and formed within the broadest aspects of the invention. For example, a ceramic magnet with radial premagnetization may be similarly formed and suitably secured to the flywheel or other support assembly. The simplicity and inexpensive production is, however, more fully obtained with the flexible magnetic strip type construction. Further, the protective cup construction is not required from a functional standpoint but should significantly contribute to the practical life of the assembly in the presence of maintenance and repair of the engine generally.

The present invention thus provides an extremely simple trigger generator rotor unit which can be directly integrated into any engine driven flywheel assembly at minimum cost.

Various modes of carrying out the invention are contemplated as being within the scope of the following claims, particularly pointing out and distinctly claiming the subject matter which is regarded as the invention.

I claim:

1. A trigger pulse generator for coupling to a driven shaft for establishing time spaced ignition control signal pulses separated by essentially zero output levels comprising an annular permanent magnet unit defining the only source of magnetic force in the pulse generator, said unit having a first annular magnet member radially magnetized, said magnet member having first and second circumferentially spaced and circumferentially extended portions, said portions being reversely magnetized whereby the first portion defines a North pole at the outer periphery of the magnet member and a South pole in radial alignment with the North pole, said magnet unit having a second annular magnet member in axially spaced adjacent relation to said first annular magnet member with first and second portions aligned with the first and second portions of the first annular magnet member, said second annular magnet member having said first and second portions oppositely magnetized from that of the first annular magnet member to define the opposite polarity first and second magnetic poles at the periphery of the magnet members to generate an axially directed field adjacent the radial edge of the magnet unit, each of said magnet portions being magnetized to a substantially constant magnetic level about the circumference of the magnet unit to define areas of sharp flux reversal on the periphery between said constant magnetic level in one direction to the said constant magnetic level in the opposite direction.

2. The trigger generator of claim 1 wherein said magnet unit includes said first and second magnet members in a continuous strip of magnetizable rubber-like material having abutting ends.

3. The pulse generator of claim 1 wherein said magnet members are a rubber-like material with embedded magnetized particles polarized to define said magnets.

4. The trigger generator of claim 1 including a signal coil unit located adjacent the outer periphery of said magnet unit and oriented with the field between said magnetic poles passing through the coil.

5. The trigger generator of claim 4 wherein said coil unit includes a generally U-shaped core having pole pieces aligned with said first and second magnetic poles and connected by a base portion, said coil unit including a coil wound about the base portion within said pole ends.

6. The trigger generator of claim 1 including a tubular hub adapted to be mounted upon a shaft, said hub having an integral circular portion of a material having high magnetic permeability, said magnet unit includes said first and second magnet members in a continuous strip of magnetizable plastic material encircling said circular exterior portion, and an adhesive bonding said strip to hub.

7. The trigger generator of claim 6 having a magnetically permeable member encircling said magnet members, and an adhesive securing said permeable member to said magnet members.

8. In a machine for producing an ignition trigger pulse magnetic flux generator for an internal combustion engine, said flux generator having an annular rotating member of high magnetic permeability and means for drivingly connecting said member to the engine crankshaft and and annular magnet member annularly positioned upon and attached to said annular rotating member, a means for magnetizing said magnet member after attachment to said rotating member comprising;

a coil having a core with opposite axially aligned pole members, means for positioning said coil with said pole members radially adjacent axially aligned upper and lower selected elongated circumferential portions of said annular magnet member, and means for supplying direct current of selected polarity and constant magnitude to said magnetizing coil, whereby said annular magnet member is separately radially magnetized in said upper and lower regions to a constant level about the selected elongated circumferential portions with opposite polarity in said axially aligned upper and lower regions and the polarity is reversed in said selected circumferential portions creating an axial magnetic field through said rotating member and adjacent a radial edge of said magnet member with one or more flux reversals therein.

9. The device of claim 8 including a plurality of said magnetizing coils each comprising an arcuate core and each positioned radially adjacent to selected circumferential sectors of said magnet means, and wherein the direct current supplied to circumferentially adjacent coil members is reversed in polarity, whereby opposite polarization of the magnet means in corresponding circumferential sectors is achieved.

10. The device of claim 9 wherein said annular magnet member is affixed to an outer annular surface of said rotating member.

11. The device of claim 9 wherein said annular magnet member is affixed to an inner surface of said rotating member.

12. The method of forming an annular rotor unit for generating time spaced trigger pulse signals comprising, fixedly attaching a non-magnetized permanent magnet member to a tubular supporting hub, assembling an electromagnetic coil assembly in fixed relation about the periphery of said magnet member, energizng said assembly with a direct current to establish a unidirectional magnetic field about a selected elongated portion of the magnet member with said magnetic field passing radially from said coil assembly through one axial end portion of said magnet member and axially through the hub and returning radially through the opposite axial end portion of said magnet member to the coil assembly and thereby forming a magnetized magnet member, said magnetic field being selected to saturate said magnet member to form permanent magnets of opposite polarization at the opposite axial ends of the annular magnet member, the magnets in said magnet member being magnetized to a constant level about the selected elongated portion, and disassembling of said magnetized magnet member from said electromagnetic coil assembly.

13. The method of claim 12 including the locating of pole pieces immediately adjacent the periphery of said magnet portions and locating a coil between said pole pieces.

14. The method of claim 12 including the step of locating a plurality of electromagnetic units about the magnet member with adjacent units establishing opposite unidirectional fields through the magnet member.

15. The method of claim 14 including the connecting of said electromagnetic units in series to a single direct current source.

* * * * *